W. B. BRADFORD.
Sash-Holders.

No. 134,727.　　　　　　　　　　　　　　　Patented Jan. 14, 1873.

Witnesses.　　　　　　　　　　　　　　　Inventor.

UNITED STATES PATENT OFFICE.

WILLIAM B. BRADFORD, OF CHARLOTTE, NORTH CAROLINA.

IMPROVEMENT IN SASH-HOLDERS.

Specification forming part of Letters Patent No. 134,727, dated January 14, 1873.

*To all whom it may concern:*

Be it known that I, WILLIAM B. BRADFORD, of Charlotte, county of Mecklenburg and State of North Carolina, have invented certain new and useful Improvements in Railroad-Car-Sash Fastener, of which the following is a specification:

My invention relates to that class of devices for holding window and sash frames; and consists in the new arrangement of a polygonal rubber roller, its case, and adjustments, more particularly in projecting the adjusting set-screw from the side of the case, as will be hereinafter more fully set forth.

Figure 1:
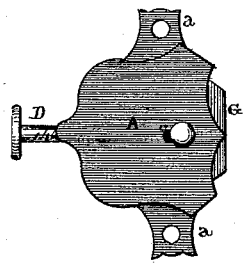
Figure 2:
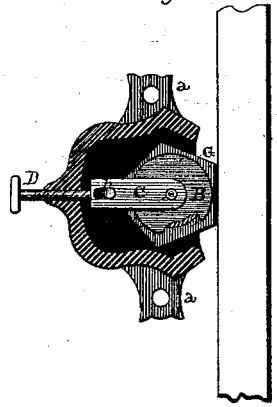

Figure 1 is a side elevation of my device. Fig. 2 is a section of the same.

A represents a frame of any suitable size or shape, and provided with the ears $a$ for securing it to the frame. B is a metallic flanged roller pivoted in the lower ends of the clip $c$. Around the periphery of this roller, between its flanges, is a polygonal rubber ring, G, which, by frictional contact with the side of the window-frame, will hold the blind or sash in any desired position. On either side, near the rear or "upper end" of the clip $c$, there is a slot, $b$, through which a rivet is passed from the outer plates of the frame A, securing said end of clip in place. The set-screw D bears against the end of clip $c$ so as to regulate the pressure of the rubber ring G. Through the sides of the frames A are slots $c$, in which the ends of the pivots $e$ play, and upon which are placed small knobs, so that the ring G can be moved to or from contact with the frame.

It will be seen that this is a very effective, simple, and cheap device, and is not liable to ever get out of order or repair.

I am aware that the set-screw is used to adjust the roller, as is shown in one of the references, but that arrangement is objectionable, as it is uncovered and liable to fill with dust, and there is no proper guide for the set-screw. I am also aware that the polygonal rubber roller is of itself old, and also the outside casing; but What I do claim, and desire to secure by Letters Patent, is—

The slotted frame A for the outside of the sash-frame, having polygonal rubber roller B G pivoted in the slotted clip $c$, and set-screw D, when all are combined to operate substantially as shown and described.

In testimony that I claim the foregoing as my invention I hereunto affix my signature this 14th day of October, 1872.

WILLIAM B. BRADFORD.

Witnesses:
    J. DUNCAN,
    WM. B. ATWELL.